June 23, 1925.

P. G. HOLLSTEIN

COCOA POWDER PLANT

Filed June 14, 1922

Inventor
Paul G. Hollstein
By his Attorneys
Emery, Booth, Janney & Varney.

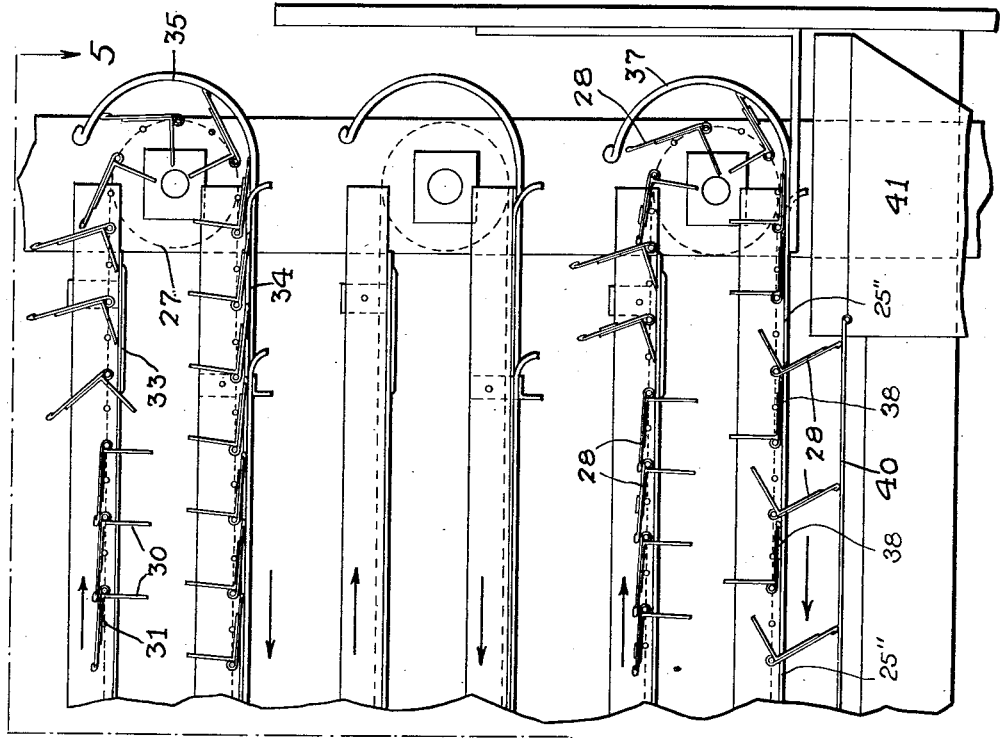
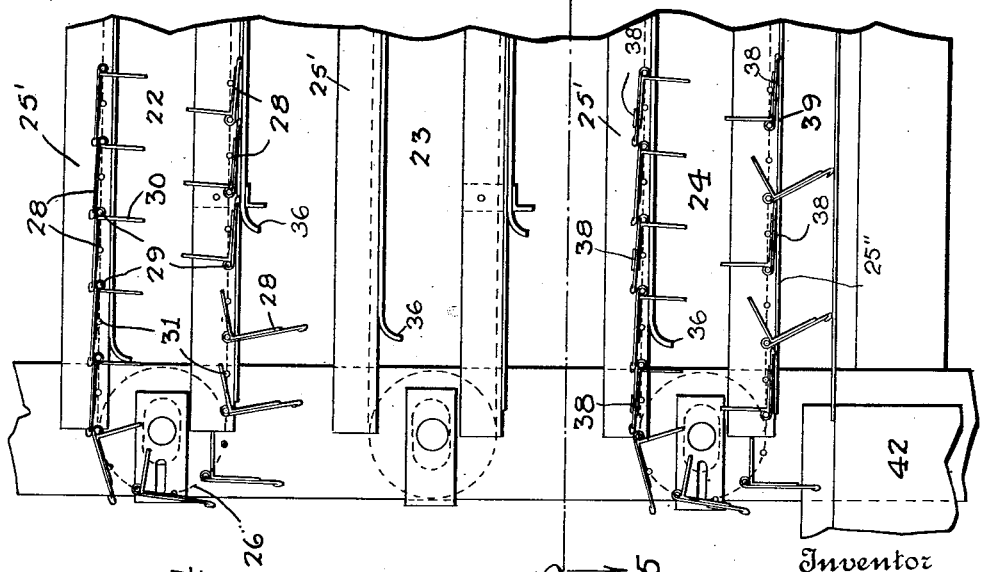
Fig. 4

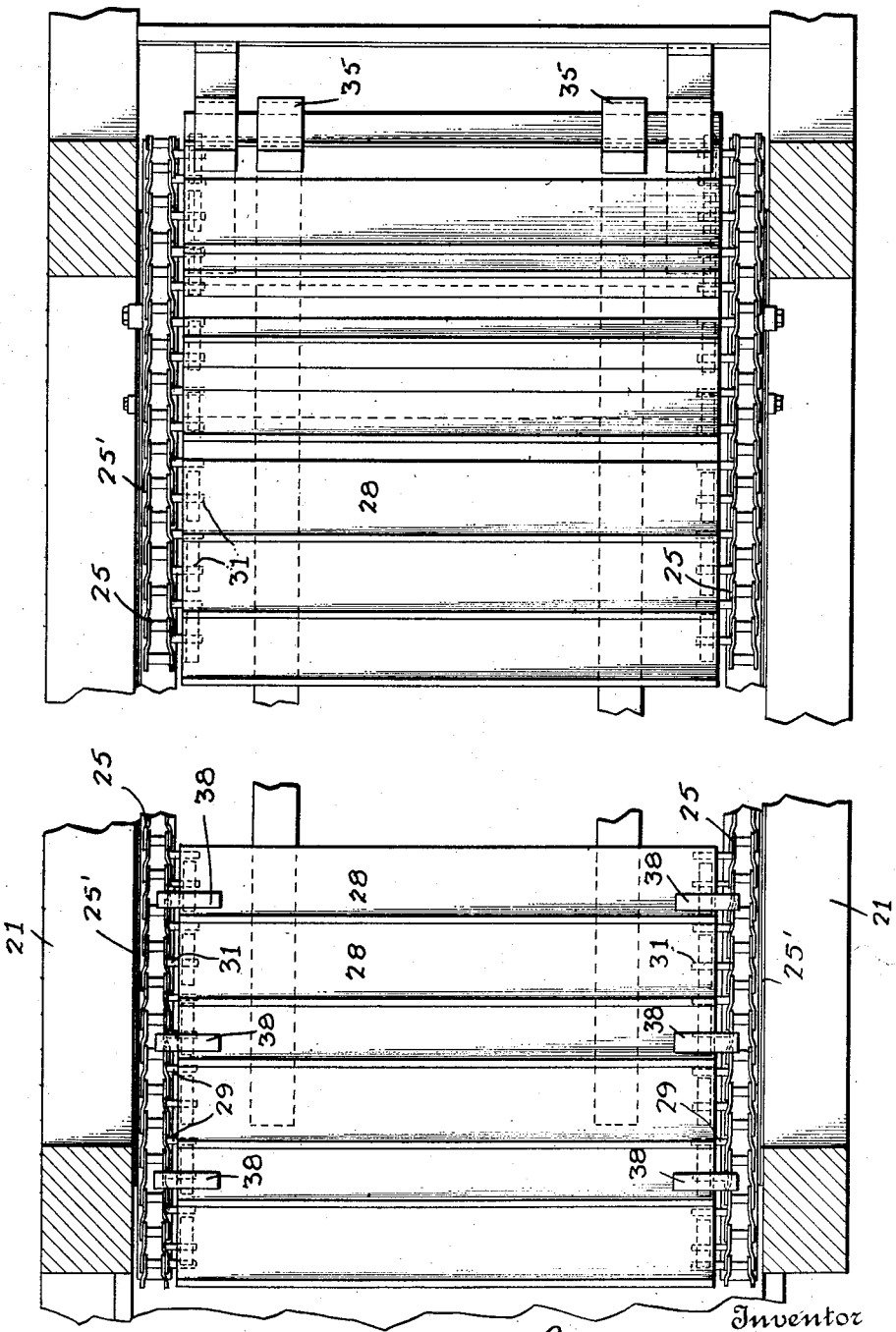

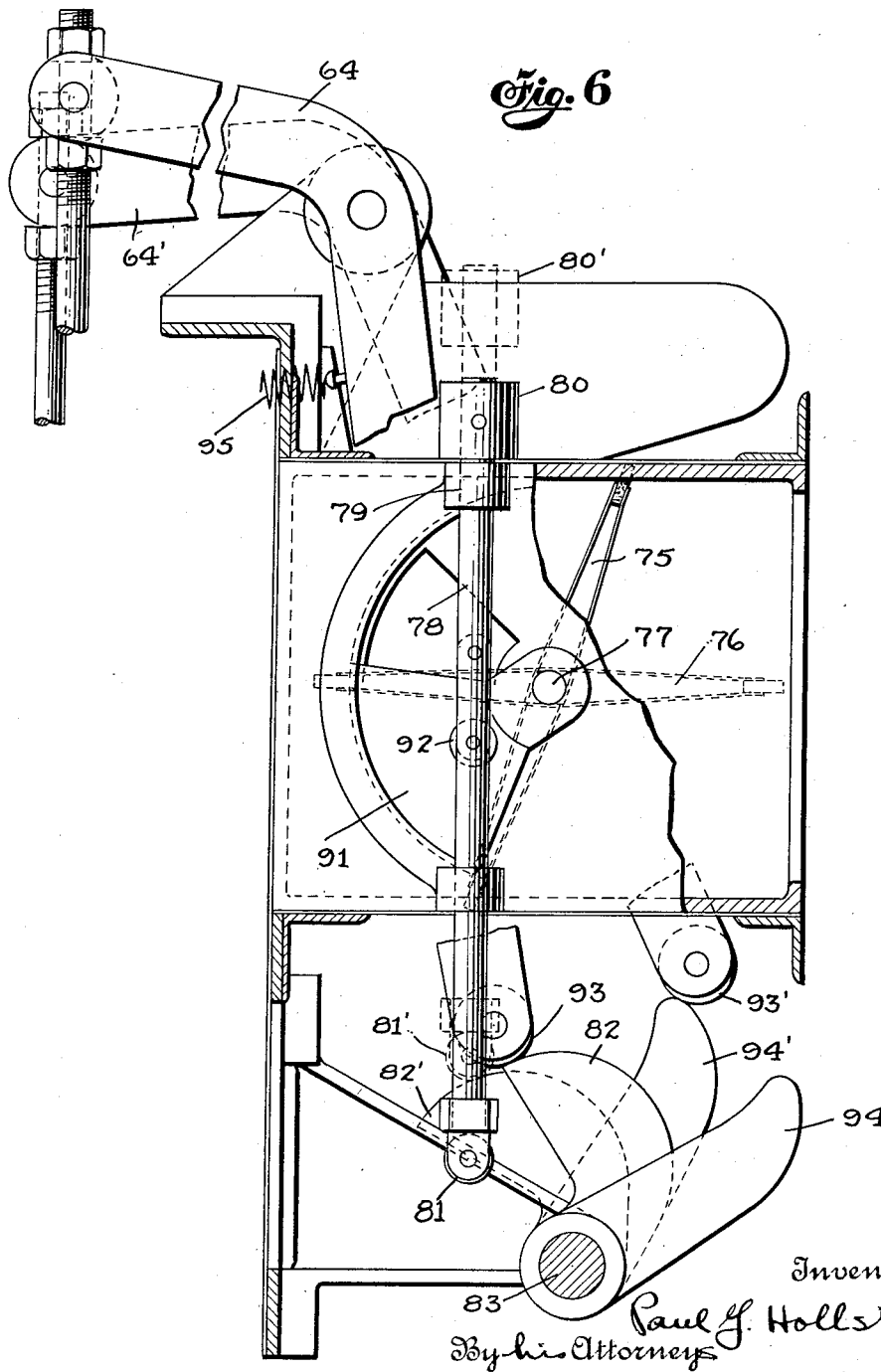

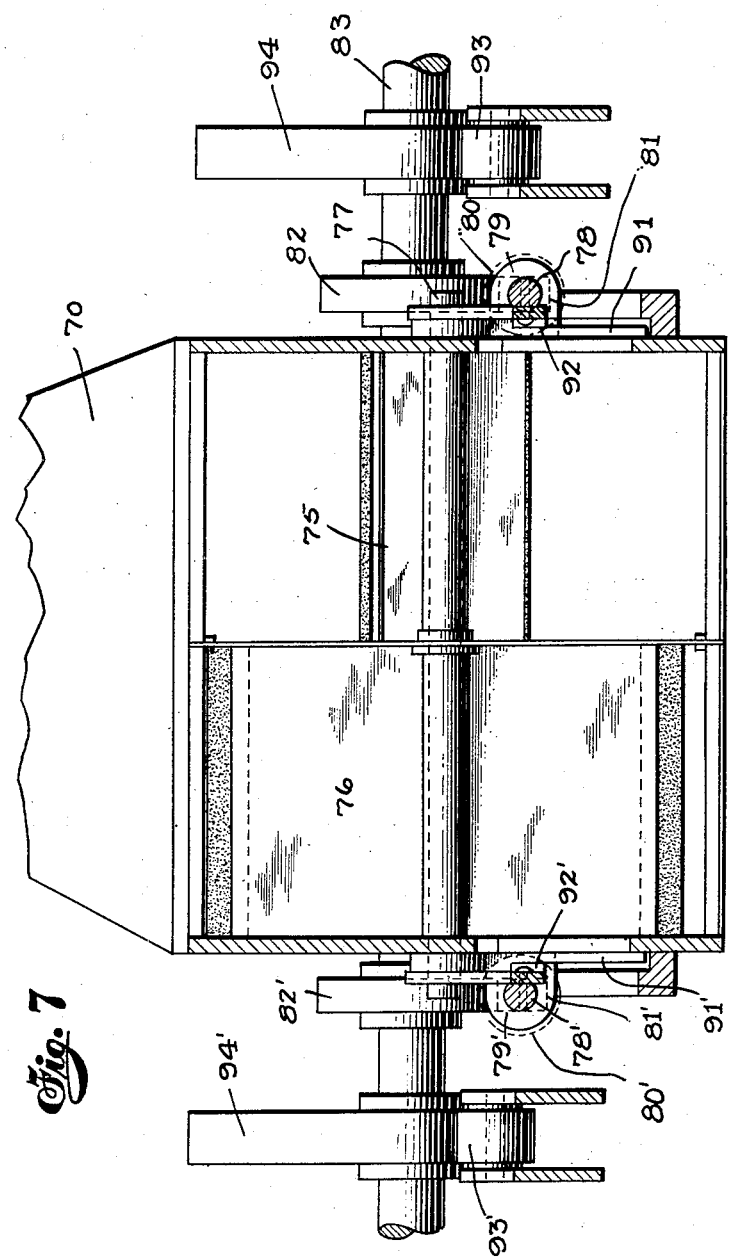

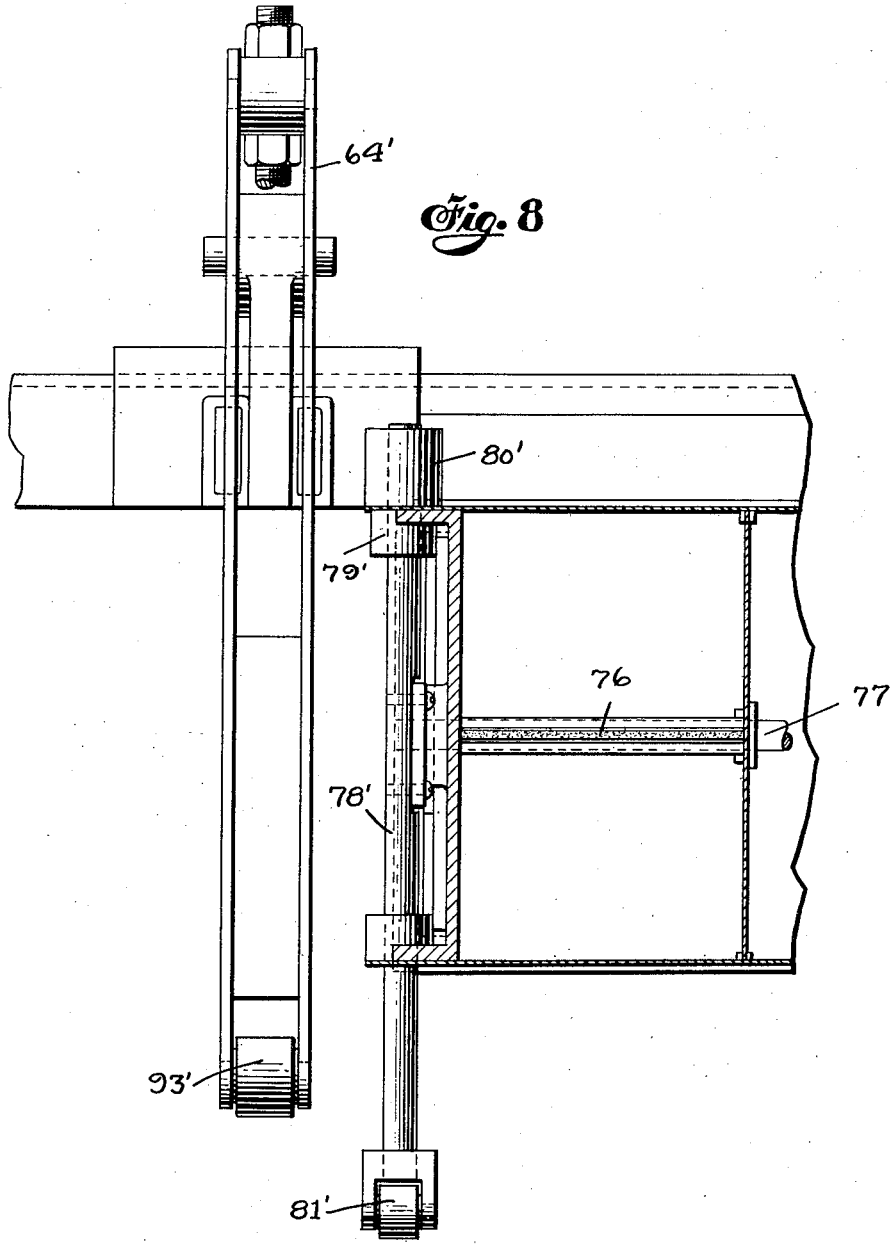

Patented June 23, 1925.

1,542,884

UNITED STATES PATENT OFFICE.

PAUL G. HOLLSTEIN, OF CARLSTADT, NEW JERSEY, ASSIGNOR TO J. M. LEHMANN COMPANY, INC., OF NEW YORK, N. Y., A CORPORATION OF NEW YORK.

COCOA POWDER PLANT.

Application filed June 14, 1922. Serial No. 568,358.

*To all whom it may concern:*

Be it known that I, PAUL G. HOLLSTEIN, a citizen of the United States, and a resident of Carlstadt, county of Bergen, State of New Jersey, have invented an Improvement in Cocoa Powder Plants, of which the following is a specification.

This invention relates to an apparatus for treating finely divided material by subjecting it to the action of a fluid medium. As illustrative of the application of the invention, I have shown it employed in the treatment of cocoa wherein the cocoa, after having been disintegrated, is subjected to the action of a heat exchange medium and cooled to prevent the cocoa butter contained therein coming to the surface to the detriment of the product. It is of course to be understood that the invention is not confined to this particular application, but has a wider scope as defined by the claims.

In the drawings

Figure 4 is an enlarged detail of the means for conveying the material through the refrigerating chamber;

Figure 5 is a sectional view on the line 5—5 of Figure 4, looking in the direction of the arrows;

Figure 6 is a vertical sectional view showing the means for separating fine particles of cocoa from the air which is circulated through the refrigerating chamber;

Figure 7 is a vertical sectional view at right angles to Figure 6; and

Figure 8 is a fragmental plan view of the mechanism shown in Figures 6 and 7.

Figure 1:
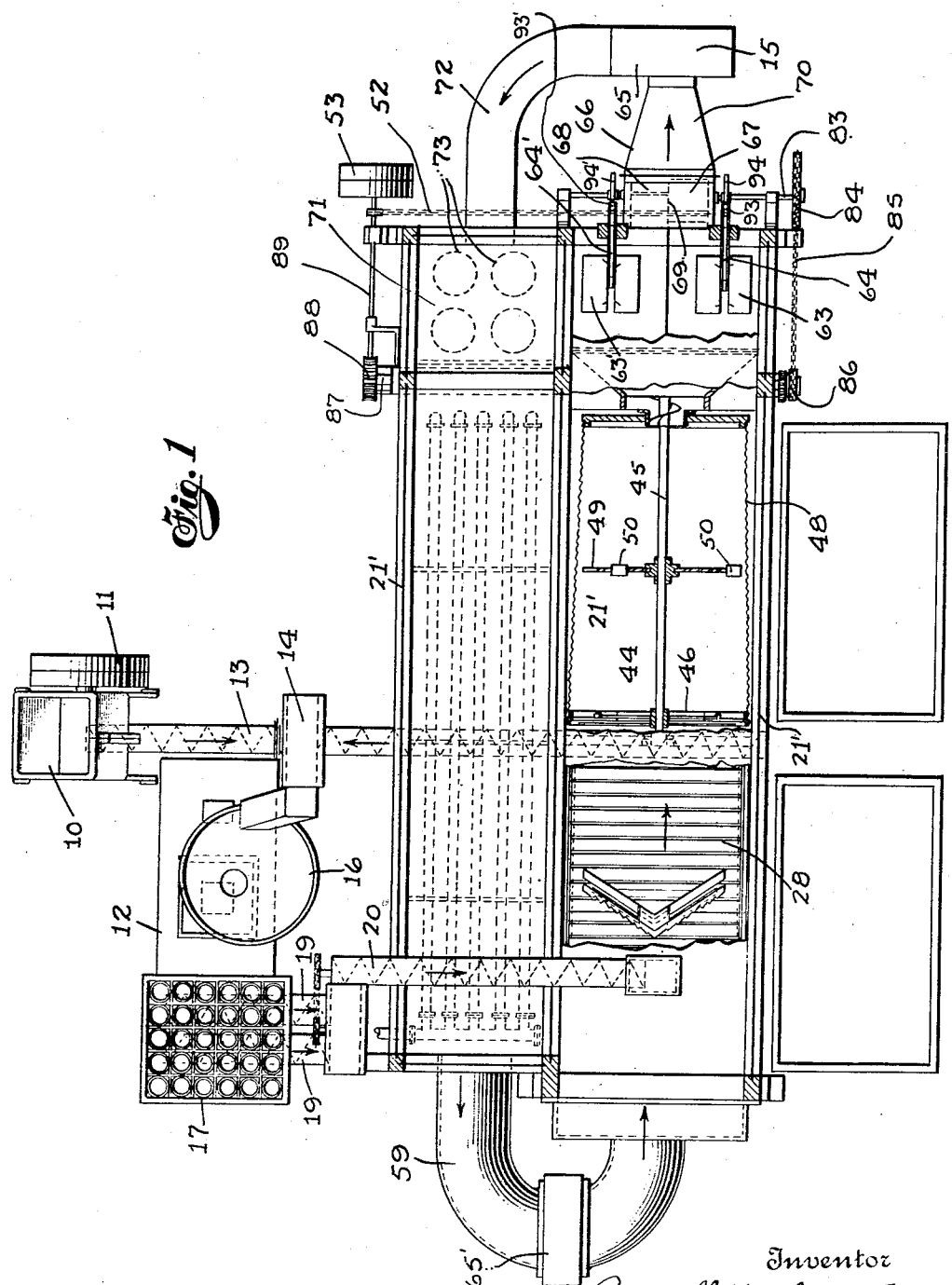
Figure 1 is a plan view of the selected embodiment of the invention, parts thereof being broken away to more clearly disclose the construction.
Figure 2:
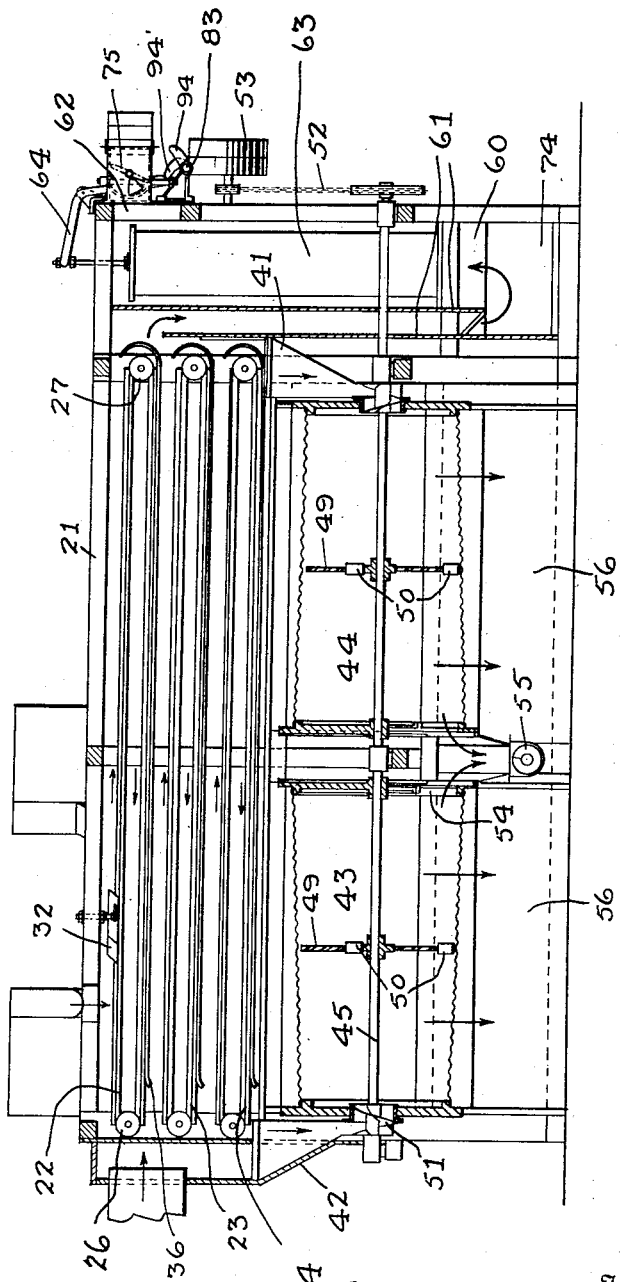
Figure 2 is a vertical longitudinal sectional view through the refrigerating chamber.

In the illustrated cocoa treating plant the cocoa cake which is the result of the expression of the major portion of the butter fat contained in the cocoa, is first subjected to the action of a crusher, and is then fed to a disintegrator, by which it is pulverized. The thus pulverized cocoa is discharged from the disintegrator into a hopper from which it is conveyed to a refrigerating chamber where it is deposited on the uppermost of a series of superimposed conveyors which act to transport the cocoa repeatedly from end to end of the chamber, and to discharge the same into suitable receptacles. This refrigerator is supplied with cold air from a suitable source to rapidly cool the cocoa to prevent the butter fat from coming to the surface and thus insuring the production of a richly colored product. From the lowermost conveyor the pulverized and cooled cocoa is discharged into bolters which separate the fine cocoa particles from the coarser particles, or tailings, which latter, before being used, must again be subjected to pulverization. The tailings are discharged from the ends of the bolters to a conveyor which transfers them to the disintegrator where they are again pulverized. During the passage of the cocoa through the refrigerating chamber air is drawn from a closed bunker room through the chamber, which is also closed, and from this chamber is again returned to the bunker room. Means is provided for separating from the circulated air, the fine particles of cocoa which are entrained therewith.

Describing now the illustrative embodiment of the invention, which is only one of the many forms the invention may take even in the particular application selected, the crusher 10, which is actuated by a suitable pulley 11, receives the cocoa cake from which the majority of butter fat has been expressed, and crushes it into small pieces. This crushed cake is transferred to the disintegrator 12 by suitable means which in the drawings takes the form of a conveyor 13, which extends horizontally and feeds the crushed cocoa into an elevator 14. This elevator discharges at 15 into the feed hopper 16 of the disintegrator. The cocoa, after having been pulverized in a disintegrator 12, is fed by the latter into the discharge hopper 17. Inasmuch as the pulverized cocoa is discharged from the disintegrator 12 with a considerable amount of hot air, it is desirable to separate the hot air from the cocoa as an initial step in its cooling and in such a manner as to prevent the establishment of back pressure.

Figure 3:
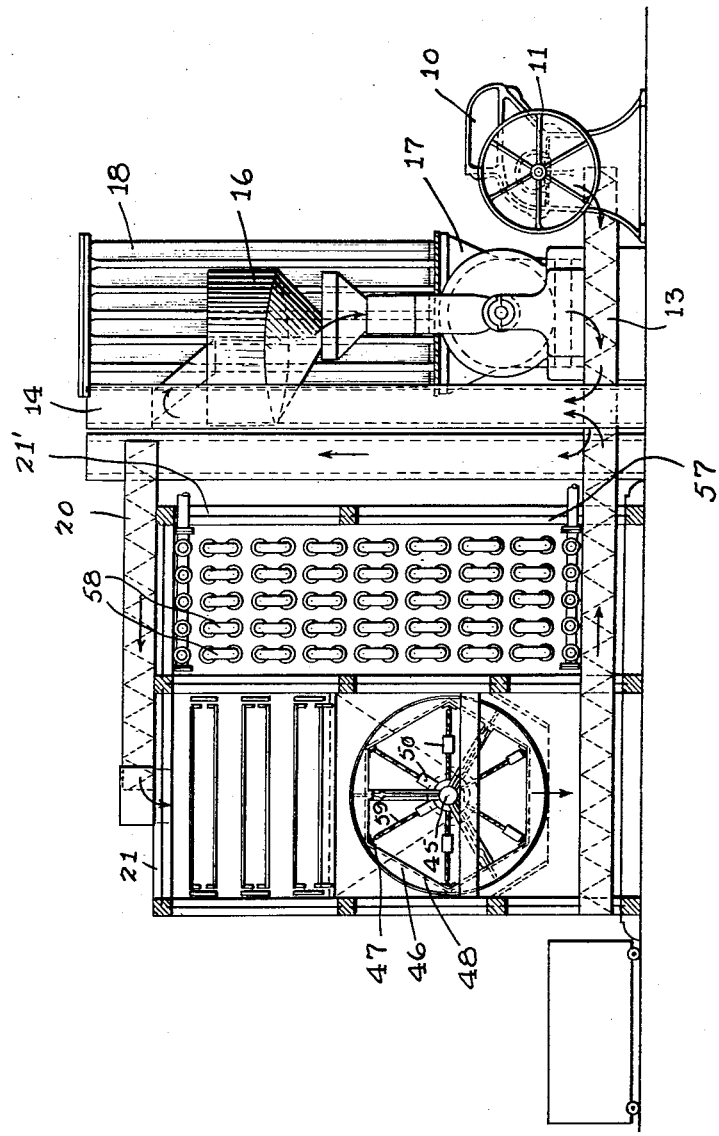
Figure 3 is a vertical transverse sectional view.

To this end means is provided for separating the cocoa from the hot air and permitting the latter to escape. This means takes the form of a series of perforate members, such as meshed bags 18, which extend upwardly from, and communicate with, the hopper 17, but are otherwise closed. These bags are of a mesh sufficiently fine to permit the air to pass therethrough but to separate the entrained cocoa dust. The bags are exposed, as clearly illustrated in Figure 3 of the drawings, so that they may be jarred to cause the cocoa adhering to their walls to fall back into the hopper 17. From this hopper the pulverized cocoa is fed by conveyors 19 to an elevator 20 which extends to the top of the refrigerating chamber 21. This refrigerating chamber is provided with walls 21', which close it to such an extent that the cool air which is drawn therethrough will be directed over the cocoa as it passes through the chamber and to the successive conveyors which will later be described.

Means is provided within the refrigerating chamber for causing the cocoa to follow a serpentine path through the refrigerating chamber. This means, as illustrated, comprises a series of conveyors 22, 23 and 24, which are arranged in superimposed relation within the refrigerating chamber, and constructed to convey the cocoa repeatedly the length of the chamber and to discharge it to the bolters which separate the fine particles of cocoa from the coarser or tailings. Each of these conveyors consists of a pair of spaced chains 25, which pass around sprockets 26 and 27 mounted in the frame of the refrigerating chamber and actuated in any convenient manner. These chains 25 pass over the horizontal webs of, and are supported by, angular supports 25'. A series of plates 28 extend between and are pivotally mounted on the chains 25, the distance between the pivots 29 of the plates and the lengths of the plates themselves being such that the plates will overlap each other to form a continuous supporting surface for the cocoa, as shown at the upper end of Figure 4. Extending in angular relation to the plates 28, and rigid therewith, are trip members 30 which are adapted to move the plates 28 in one direction and to engage studs 31 to limit such movement.

Arranged above the upper flight of the uppermost conveyor 22 is a spreader 32, which distributes an even layer of cocoa over the upper flight after the cocoa has been deposited thereon by the screw conveyor 20. At the end of the conveyor 22 remote from the elevator 20 is an abutment 33, which is arranged in the path of movement and adapted to engage the then downwardly extending trip members 30. Supporting strips 34 extend beneath the lower flight of the upper conveyor 22, and have upwardly extending curved portions 35 at the end of the conveyor remote from its receiving end. These supporting strips are adapted to sustain the plates 28 when they form the lower flight of the upper conveyors 22, so that they will be in substantially horizontal positions, and provide a continuous surface for carrying the cocoa. The supporting strips 34, however, terminate short of the end of the conveyor 22 at 36, so that before the plates 28 reach the sprockets 26 they are permitted to move downwardly about their pivots 29 until the trips 30 engage the adjacent studs 31.

The construction of the intermediate conveyor 30 is similar to that of the uppermost conveyor 22, except that the former is not provided with a spreader, and in view of this similarity of construction the intermediate conveyor is not specifically described.

The construction of the lowermost conveyor is generally similar to that of the other conveyors, but this conveyor is provided at one end with curved guides 37 which are engaged by the ends of plates 28 after they pass from the upper to the lower flights of the conveyor. The alternate plates 28 of this lower conveyor are provided with transversely extending lugs 38 which are adapted to engage the horizontal webs 39 of the angular chain supports 25'. This engagement retains the plates 28 in substantially horizontal position where they will support the cocoa and convey it from one end of the refrigerating chamber to the other (see Figure 4). The other plates, however, are not provided with lugs, but are permitted to move downwardly about their pivots, their movement being arrested before the trips 30 reach the studs 31 by the engagement of the edges of the plates 28 with guides 40 which are arranged beneath the lower flight of this conveyor, the guides acting to retain the plates in inclined positions, and the plates acting as scrapers to remove the cocoa which falls on to the floor 40.

While I have described the means for conveying the cocoa through the refrigerating chamber as comprising an upper, lower and intermediate conveyor, it is, of course, to be understood that the number of conveyors may be varied as the necessity arises.

With this arrangement of conveyors the cocoa is fed onto the receiving end of the uppermost conveyor which carries it throughout substantially the length of the refrigerating chamber. When the depending trips 30 of the plates 28 which constitute the supporting surface of this conveyor successively engage the edge of the abutment 33, the plates will be moved pivotally upward into such positions as shown in the right hand of Figure 4 of the drawings. In passing around the adjacent sprocket the positions of the plates 28 are reversed so that the trips 30 extend upwardly and the plates are supported by the guides 34 in substantially horizontal positions to form a continuous conveying surface for the cocoa. As the trips 30 engage the abutments 33, the upward movements of the plates 28 deposits the cocoa on the upper surface of the lower flight of the conveyor 26, by which it is carried to the opposite end of the refrigerating chamber and the plates 28 pass from the end of the supporting strips 34. At this time the plates swing pivotally downwardly and deposit the cocoa on the upper flight of the next succeeding lower conveyor 23. This upper flight of the latter conveyor carries the cocoa substantially the length of the refrigerating chamber, and deposits it on the lower flight of the said conveyor in a manner similar to that described in connection with the receiving conveyor. The cocoa is carried by this lower flight of this intermediate conveyor to the opposite end of the cooler, and is deposited on the next succeeding intermediate conveyor. Where more than one is used, or where only one intermediate conveyor is used, it is deposited on the upper surface of the lowermost conveyor 24 by the downwardly swinging of the plates 28. The thus deposited cocoa is again carried the length of the refrigerating chamber and by the upward pivotal movement of the plates 28, caused by the coaction between the trips 30 and the abutment 33, the cocoa is deposited on the upper surfaces of the plates 28, which are included in the lower flight of the lowermost conveyor, and are, at the time of receiving the cocoa, supported by guides 37.

As hereinbefore described, the alternate plates 28 of the lowermost conveyor are provided with lugs which support the plates in substantially horizontal positions, while the other plates are permitted to move downwardly pivotally until their edges engage the guides 40. As the plates 28 successively pass off of the guide 37, the lugs 38, riding on the horizontal webs 25″ of the guides 25′, sustain the alternate plates in horizontal positions, while the other plates 28 move downwardly pivotally and discharge the cocoa carried thereby into a hopper 41. The cocoa which is carried by the alternate horizontally supported plates is again carried the length of the refrigerating chamber and as the lugs 38 pass from the ends of the horizontal webs 25″ of the guides 25′ these plates move downwardly pivotally and discharge the cocoa into the hopper 42.

Thus it will be seen that the entire amount of cocoa is deposited on the upper flight of the upper conveyor, and is carried the length of the refrigerating chamber by each flight of each conveyor except the lower flight of the lowermost conveyor. However, a portion of the cocoa is deposited at one end of the refrigerating chamber into the adjacent hopper 41 by the lower flight of the lowermost conveyor, and the remaining cocoa is carried to the opposite end of the refrigerating chamber where it is deposited in the other hopper 42. By this arrangement of conveyors within the refrigerating chamber the cocoa is subjected to the action of the cool air for a sufficient length of time to insure the retention of the butter fat beneath the surface of the cocoa particles, and the production of a rich colored product. The superimposing of the conveyors, however, consumes the minimum space commensurate with the proper cooling of the cocoa.

In order that the fine particles of cocoa which leave the lower flight of the lowermost conveyor may be separated from the coarser particles, I have provided a pair of bolters 43 and 44, which are mounted on a common shaft 45, beneath the refrigerating chamber 21. One such bolter is adapted to receive the cocoa discharged from one end of the lowermost conveyor and the other to receive the cocoa which is discharged from the opposite end of the said conveyor. Each of these bolters comprises end pieces 46 between which angle bars 47 extend. A screen 48 of fine mesh, and preferably of silk, is supported by these bars 47, to form the receptacle for the cocoa. Arranged within each of the bolters is a vibrating device which in the illustrated embodiment takes the form of a series of radial arms 49 rigid with and extending from the shaft 45 and terminating adjacent to each of the bars 47. Weights 50 are slidably mounted on these arms 49 and are adapted, as the bolters rotate, to successively move outwardly radially to strike the bars 47 with sufficient impact to vibrate the screen 48 to jar the cocoa from the upper parts of the screen to clear the interstices and to facilitate the passage of the cocoa through the lower part of the screen.

The hoppers 41 and 42 discharge axially into the bolters through feeding conveyors 51, which are actuated by the shaft 45 which shaft is rotated through a connection 52 to a driving pulley 53. Each of the bolters increases in diameter toward an open end 54 through which the tailings from the bolters pass to a conveyor 55, which passage is facilitated by the inclination of the bolters toward the conveyor and by the vibration of the bolters. This conveyor 55 leads to the elevator 14 by which the tailings are again conveyed to the disintegrator 12.

Thus it will be seen that the finer or usable cocoa, in which the butter fat has been fixed below the surface, which is fed to the bolters through the hoppers 41 and 42, passes through the bolters into receptacles 56 and the tailings or larger cocoa particles pass through the openings 54 into the conveyor 55 by which it is transferred to the disintegrator where it is pulverized.

Means is provided for supplying cold air to the refrigerating chamber, and for maintaining a circulation of said air through the chamber. This means in the illustrated embodiment includes broadly a bunker room 57 in which the air is cooled and a pair of fans for circulating the air through the bunker room and through the refrigerating chamber. This bunker room, as illustrated in the drawings, is mounted adjacent to the refrigerating chamber, in which bunker room cooling coils 58 containing ammonia or brine are disposed. This bunker room is connected to the refrigerating chamber by a conduit 59 so that the air from the former may pass to the latter.

A compartment 60 is located at one end of the refrigerating chamber through which the air passes after leaving the refrigerating chamber with which air cocoa dust is entrained. In this compartment a series of baffles 61 causes the air from the refrigerating room to pass downwardly and thence upwardly to an outlet opening 62. Dust collectors 63 and 63' in the form of perforated tubes, and preferably meshed bags, are suspended for vertical movement on bell crank levers 64 and 64', and are arranged between the compartments 60 and the outlet opening 62, so that the air which passes from the refrigerating chamber through the compartment 60 must pass through the dust collectors or bags before it escapes through the opening 62. The cocoa will be separated from the air by the bags and retained on the inner walls of the latter. Each of these dust collectors 63 and 63' is mounted in a separate compartment, so that they may be alternately brought into operation. The outlet opening 62 is connected to a suction fan 65 by a casing 66 which, adjacent to the opening 62, is divided into the two passages 67 and 68 by a partition 69. These passages lead into a common passage 70 to the fan 65, which fan has communication with a compartment 71 by a duct 72. The compartment 71 contains filter bags 73 and communicates with the bunker room so that the air which is drawn from the collectors 63 and 63' and forced through the duct 72 into the compartment 71 passes through the filter bags before being returned to the bunker room.

Means is provided for alternately opening the passages 65 and 68, so that the air from the refrigerating chamber will be drawn alternately through the dust collectors 63 and 63', thus enabling these collectors to be alternately jarred to free the cocoa dust therefrom and permit it to drop into a receptacle 74 located in the lower end of the compartment 60 while there is no current of air passing through the jarred collector. This means includes butterfly valves 75 and 76 in the passages 67 and 68 which valves are mounted on a common shaft 77, extending transversely of the casing 66. Rods 78 and 78' are vertically slidable in bearings 79 and 79' and are provided at their upper ends with weights 80 and 80', and at their lower ends with cam rollers 81 and 81', which are adapted to be engaged by continuously rotating cams 82 and 82' rigidly carried by the shaft 83. The shaft is actuated through a train of mechanism including a sprocket 84, chain 85, which passes around the sprocket 84 and around a second sprocket 86, on a shaft 87, a gear and worm 88, and a shaft 89 actuated by the drive pulley 53. The rods 78 and 78' are connected to slide valves 91 and 91' by links 92 and 92'. These valves are rigid with the shaft 77 and are arranged so as to alternately close openings in the passages 67 and 68, the passages being closed when the adjacent butterfly valve is open and being open when the adjacent butterfly valve is closed, so as to permit a reverse current of air to pass into the adjacent collector in the compartment 60.

The bell crank levers 64 and 64' which have heretofore been described as supporting the dust collectors 63 and 63', are provided with cam rollers 93 and 93', which are adapted to engage continuously rotating cams 94 and 94', rigid with the shaft 83. These cams, upon engagement with the rollers, move the bell crank levers 64 and 64' pivotally against the action of springs 95 to alternately raise the dust collectors 63 and 63'. Upon the release of the levers 64 and 64' by the passage of the cams 94 and 94' the springs 95 will raise the dust collectors with a jar, and free the cocoa dust therefrom so that it will fall into the compartment 60.

A fan 65' is mounted in the conduit 59 between the bunker room and the refrigerating chamber to assist the fan 65 in maintaining a circulation of air through the bunker room and radiator chamber. This fan 65' revolves relatively slower than the fan 65, so that the pressure within the refrigerating chamber is reduced. The reduction of pressure is controllable by a variation of the relative speeds of the fans.

Summarizing this portion of the plant, we will assume the butterfly valve 75 to be closed and the butterfly valve 76 to be opened, as shown in Figures 6 and 7 of the drawings. At this time the slide valve 91 associated with the butterfly valve 75 will be opened to permit air to pass into the dust collector compartment and create a reverse current of air to destroy any tendency to a vacuum within the compartment which would prevent the downward falling of the cocoa dust. The fan 65 causes a circulation of the air from the bunker room 57 through the conduit 59. The fan 65 is assisted by the fan 65', which causes a circulation of air from the bunker room 57 through the conduit 59 over the various flights of the conveyors within the refrigerating chamber through the compartment 60 and the dust collector 63' through the conduit 72 and the filter compartment 71 back to the bunker room, the butterfly valve 76 being open and the slide valve 91' being closed. As the shaft 83 rotates the cams 81, 82' and 94' will release respectively the lever 64' and the rod 78', so that the former will be moved pivotally under the action of the spring 95' and the latter will move downward by gravity. The movement of the lever 64' will raise the dust collector 83' and jar the cocoa dust therefrom so that it will fall into the receptacle 74 in the lower part of the compartment 60, while the downward movement of the rod 78' will open the slide valve 91 to permit the air to pass into the dust collector chamber 60 to create a back draft and destroy a tendency to a vacuum. This movement of the rod 78' will also close the butterfly valve 76. As the butterfly valve 76 is closed the butterfly valve 75 will be opened and the slide valve 91 closed under the action of the respective cams 82 and 94, whereby the air will be drawn through the dust collector 63, allowing the dust in the collector 63' ample time to fall into the receptacle 64 before the latter dust collector is again brought into action. This alternate operation of the valves 75 and 76 will be continuous, the air being first drawn through one collector and then the other, and the collected dust being shaken from the collectors alternately as the passage of the air is stopped.

While I have described a particular application of my invention, and also a particular construction of that application, it is to be understood that the invention is not limited either to the application or to the specific embodiment as many changes both in the construction and application may be made within the scope of the claims.

I claim:

1. In a plant of the class described, the combination with a material treating chamber and a heat exchange room, of means for maintaining the circulation of a heat exchange medium through said chamber and room and in contact with the material, means for separating the entrained material from the medium before it is returned to said heat exchange room, means for preliminarily treating and delivering material to said treating chamber, means for separating the different grades of material after treatment and means for returning one separated part of the material to the preliminary treating means.

2. In a plant of the class described, the combination with a material treating chamber and a heat exchange room, of means for maintaining the circulation of a heat exchange medium through said chamber and room and in contact with the material, and means for separating the entrained material from the medium before it is returned to said heat exchange room, said chamber including a series of superimposed conveyors for successively transporting the material from end to end of the chamber.

3. In a plant of the class described, the combination with a material treating chamber and a heat exchange room, of means for maintaining the circulation of a heat exchange medium through said chamber and room and in contact with the material, and means for separating the entrained material from the medium before it is returned to said heat exchange room, said chamber including means for transporting the material repeatedly from end to end of the same.

4. In a plant of the class described, the combination with a material treating chamber, of means for pulverizing material and delivering it to said chamber, means for separating the material from the entrained air prior to its delivery to the chamber, means for forcing a heat exchange medium through said chamber and in contact with the material, means for separating entrained material from said medium, and means for separating the different grades of material and returning one grade of material to the pulverizer.

5. In a plant of the class described, the combination with a material treating chamber, of means for pulverizing material, means for conveying the pulverized material to the chamber, means interposed between the said pulverizing means and conveying means for separating the material from the entrained air, and means for forcing a heat exchange medium through said chamber and in contact with the material, said separating means including a plurality of perforate elements constructed to permit the air to pass therethrough but to prevent the passage of the pulverized material.

6. In a plant of the class described, the combination with a refrigerating chamber, of a bunker room, means for maintaining a circulation of air through the same, said means including conduits extending from the bunker room to the chamber and from the chamber to the bunker room, a fan in the former conduit for forcing air into the chamber, a fan in the latter conduit for drawing air from the chamber, said latter fan being rotatable at a greater speed than the former, means for pulverizing the material, means for delivering the pulverized material to the refrigerating chamber, means for conveying the pulverized material through the refrigerating chamber, means for separating the different grades of material, and means for separating the entrained material from the air before the latter passes from the refrigerating chamber.

7. In a plant of the class described, the combination with a refrigerating chamber, of a bunker room, means for maintaining a circulation of air through the same, means for pulverizing the material, means for delivering the pulverized material to the refrigerating chamber, means for conveying the pulverized material through the refrigerating chamber, said means comprising a series of super-imposed endless conveyors, certain of said conveyors being constructed to transport the entire amount of material from end to end of the chamber on both of their flights, and another of said conveyors being constructed to transport the entire amount of material on one of its flights, and a portion only of the material on its other flight, means for receiving material from both ends of the lowermost conveyor, means for separating the different grades of material, and means for separating the entrained material from the air before the latter passes from the refrigerating chamber.

8. In a plant of the class described, the combination with a refrigerating chamber, of a bunker room, means for maintaining a circulation of air through the same, means for delivering material to the refrigerating chamber, means for conveying the entire amount of material repeatedly from end to end of the chamber, means for separating the material, means for delivering a portion of the separated material from one end of the chamber, conveying the remainder of the material to the other end, and delivering said remainder from said end of the chamber, means for separating the different grades of material, and means for separating the entrained material from the air before the latter passes from the refrigerating chamber.

9. In a plant of the class described, the combination with a refrigerating chamber, of a bunker room, means for maintaining a circulation of air through the same, means for pulverizing the material, means for delivering the pulverized material to the refrigerating chamber, means for conveying the pulverized material through the refrigerating chamber, means for separating the different grades of material, means for separating the entrained material from the air before the latter passes from the refrigerating chamber, said last-mentioned means including a compartment through which the air passes, dust collectors mounted in said compartment, means for alternately throwing the dust collectors into operation, and means for establishing communication between the atmosphere and the dust collectors alternately.

10. In a plant of the class described, the combination with a refrigerating chamber, of means for transporting material repeatedly from end to end of said chamber, a bunker room contiguous with the refrigerating chamber, conduits connecting the ends of the bunker room and the chamber, and means for maintaining a circulation of air through the bunker room and chamber and for reducing the pressure in the chamber.

11. In a plant of the class described, the combination with a refrigerating chamber, of a bunker room arranged adjacent to the same, bolters arranged beneath the chamber, means for delivering material to the chamber, means for delivering the material from the chamber to the bolter, and means for maintaining a circulation of a heat exchange medium through the bunker room and refrigerating chamber.

12. In a plant of the class described, the combination with a refrigerating chamber, of means for maintaining a flow of heat exchange medium through said chamber and for reducing the pressure in said chamber, endless conveyors in the chamber for transporting the material from end to end thereof, one of said conveyors including a series of transversely pivoted plates, means for supporting the plates of said conveyor to form continuous upper and lower flights, means for moving the plates successively pivotally to permit the material to pass from the upper flight to the lower flight and to permit the material to pass from the lower flight to the next succeeding conveyor.

13. In a plant of the class described, the combination with a material treating chamber, means for passing a current of air through the treating chamber and means for feeding material to said chamber, of means for transporting material from end to end thereof, said means including an endless conveyor adapted to receive the material on its upper and lower flights, means for causing the passage of the material from the upper to the lower flight of said conveyor through the currents of air, and means for separating and returning a part of the treated material to the treating chamber for further treatment.

14. In a plant of the class described, the combination with a material treating chamber, means for pulverizing and feeding material to the treating chamber, of an endless conveyor in said chamber, said conveyor consisting of a plurality of pivoted plates, means for supporting all of said plates to form a continuous upper flight, means for supporting alternate plates to form an interrupted lower flight, and means for moving the plates pivotally to permit the material to pass from the upper to the lower flights.

15. In a plant of the class described, the combination with a material treating chamber, means for pulverizing and feeding material to the treating chamber, of an endless conveyor mounted therein having a continuous surface upper flight and an interrupted surface lower flight, a series of superimposed conveyors arranged to transport the material from end to end of the chamber and to deliver it successively to each flight of each of the conveyors and means for passing a current of air between said conveyors to cool the material as it lies on the conveyors and as it passes from flight to flight.

16. In a plant of the class described, the combination with a refrigerating chamber, means for pulverizing and feeding material to the refrigerating chamber, of a pair of bolters mounted beneath the same, means for conveying the material from end to end of the chamber in both directions, means for delivering a portion of the material to each of the bolters and means for returning the screenings from the bolters to the pulverizing means.

17. In a plant of the class described, the combination with a refrigerating chamber, means for pulverizing and feeding material to the refrigerating chamber, of means for maintaining a flow of air therethrough to cool the material, and means for separating the entrained material from the air, which means includes a plurality of perforated elements, means for causing the air to pass through one of said elements, means for preventing the air from passing through the other of said elements, and means for permitting a reverse current of air to pass to the latter element.

18. In a plant of the class described, the combination with a refrigerating chamber having a compartment at the end thereof, means for pulverizing and feeding material to the refrigerating chamber, a plurality of perforated elements mounted in said compartment, means for causing a flow of air through said chamber, and through said elements, means for alternately moving said elements vertically, means for preventing the passage of air through said elements alternately during their movement and means for permitting a back draft during such movement.

19. In a plant of the class described, the combination with means for pulverizing and feeding material, a refrigerating chamber having an outlet opening, of a compartment disposed between the chamber and opening, dust collectors mounted in said compartment for vertical movement, a housing communicating with said outlet, a fan connected to the housing, said housing having two passages, one communicating with each dust collector, a butterfly valve for alternately closing said passages, valves for alternately establishing communication between the atmosphere and the dust collectors, and means for moving said dust collectors vertically when such atmospheric communication is established.

20. In a plant of the class described, the combination with a material treating chamber and a heat exchange room, of means for maintaining the circulation of a heat exchange medium through said chamber and room and in contact with the material, and means for separating the entrained material from the medium before its return to said heat exchange room, conveyor means for transporting material repeatedly from end to end of said treating chamber and for causing it to fall repeatedly through the circulating heat exchange medium, substantially as and for the purpose described.

In testimony whereof, I have signed my name to this specification this 10 day of June 1922.

PAUL G. HOLLSTEIN.